Figure 1:
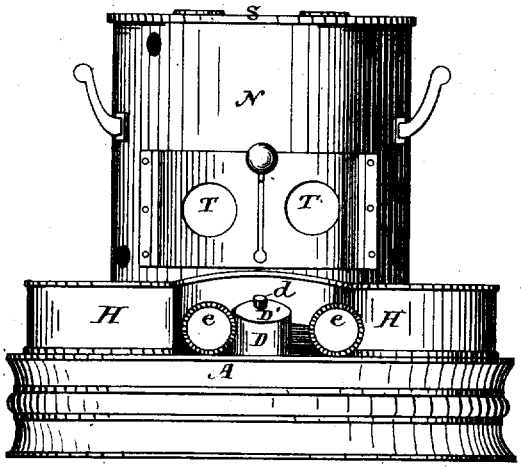

J. BOWLES,

Assignor, by mesne assignments, to himself and C. RIESSNER & Co.

Lamp for Coal Oil Stoves.

No. 9,626. Reissued March 29, 1881.

Witnesses:

E. E. Masson

C. J. Hedick

Inventor:

John Bowles by

A. Pollok his attorney

N. PETERS, PHOTO-LITHOGRAPHER, WASHINGTON, D. C.

UNITED STATES PATENT OFFICE.

JOHN BOWLES, OF WASHINGTON, D. C., ASSIGNOR, BY MESNE ASSIGNMENTS, TO HIMSELF AND C. RIESSNER & CO., OF NEW YORK, N. Y.

LAMP FOR COAL-OIL STOVES.

SPECIFICATION forming part of Reissued Letters Patent No. 9,626, dated March 29, 1881.

Original No. 111,512, dated February 7, 1871. Application for reissue filed February 17, 1881.

*To all whom it may concern:*

Be it known that I, JOHN BOWLES, of Washington, in the District of Columbia, formerly of Augusta, county of Richmond, and State of Georgia, have invented certain Improvements in Coal-Oil Stoves, of which the following is a specification.

The first part of my invention relates to an improvement in the mode of using an open-top water-reservoir and the burners of the coal-oil lamp.

The heat generated by coal-oil stoves of the ordinary construction is very great, and it is very important that the parts below the flame should be kept cool. A great amount of heat is radiated from the upper parts of the stove, and the wick-tubes conduct a great amount of heat toward the oil-holder. The wick-raising device in such apparatus consists of the ordinary star-wheels having a shaft and a thumb-piece. These star-wheels work through slots in the wick-tube against the wick, which is saturated with kerosene-oil. The heat conducted down the wick-tube or radiated from the upper parts of the apparatus is apt to generate gas at the point where these slots are situated. Even if the wick-wheels were themselves protected and the shafts which carry them exposed to the radiated or conducted heat, they would, on becoming heated, transmit their heat to the wick-wheels, thus enhancing the generation of gas. The parts of a coal-oil stove should therefore be organized in such a manner as to keep the wick-raising device and the wick-tube at the slots cool, as such generation of gas is disagreeable and sometimes dangerous. For the protection of the oil-holder it has been common to use an open water-reservoir placed above the oil-holder and between it and the flame; but I know of no coal-oil stove in which a water-reservoir has been utilized for the purpose of preventing the undue heating of the wick-raising apparatus and of the parts of the wick-tube pierced by the slots through which the star-wheels work.

I have succeeded in making a coal-oil stove in which efficient protection is given against overheating at the slots of the wick-tube and in the wick-raising apparatus. In my coal-oil stove the oil-reservoir, the water-reservoir, the wick tube or tubes, and the wick-wheels and wick-wheel shaft or shafts are arranged so that the surface of the water is above the wick-wheel shafts and above the wick-wheels, thereby efficiently protecting them and the oil-reservoir from the heat of the flame. I also provide a recess for containing the wick-wheels and the greater portion of the wick-wheel shafts below the surface of the water, the wick-wheels and their shaft or shafts being within or below such recess or recesses, so that the water serves to protect the recess or recesses and the wick-wheels and their shaft or shafts, as well as the oil-reservoir, from the heat of the flame, not only by means of their being beneath the surface of the water, but also by the water cooling the containing-walls of the recess by contact. It is important in structures of this nature not to have the wick-tubes of undue length, and by the construction which I have adopted, the recesses being formed on the under side of the water-reservoir, so as to embrace and cover the tooth or ratchet wheels and rods on the side of the wick-tubes, serving to operate the wicks therein, I am enabled to accomplish this end and at the same time have a deep reservoir, holding a considerable quantity of water.

The second part of my invention relates to the combination of jackets of cloth or other absorbent material with the exterior surfaces of the projections in the water-pan made to embrace the wick-tubes of the lamp, the object of this part of my invention being to keep said wick-tubes cool by cooling the inclosing-casing with a constant supply of moisture.

The third part of my invention relates to an improved form of wick-arrester, consisting of a bent spring or pawl placed exactly opposite each ratchet-wheel operating the wick, so that the upper end of the spring shall bear through a slot in the wick-tube against the wick therein, or, if the upper end of the wick drops down below the same, shall spring across the tube and engage the teeth of the ratchet, so as to prevent its further revolution before the wick has fallen entirely below the reach of the ratchet-teeth; and in the combination, with said spring, of a cam on a horizontal rod, whereby the spring may be thrown and fastened back when it is desired to relieve the wick from its operation. The object of this part of my invention is to prevent, by an automatic device, the accidental forcing back of the wick into the oil-reservoir, from which it could not be removed without difficulty.

Figure 2:
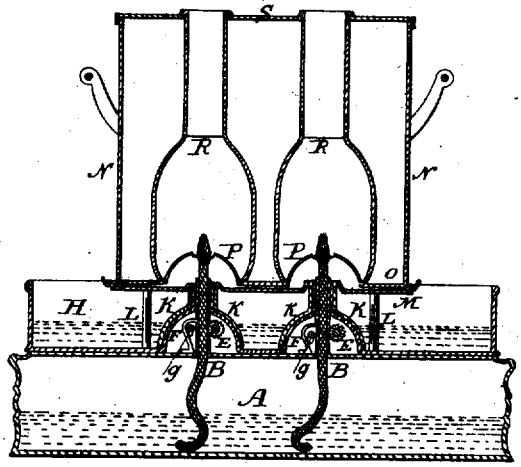
Figure 3:
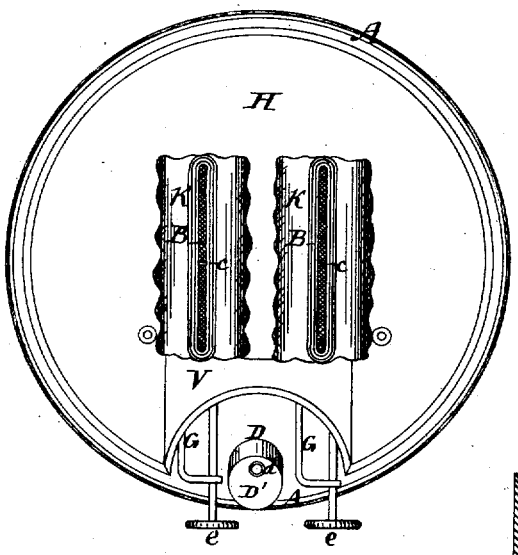
Figure 4:
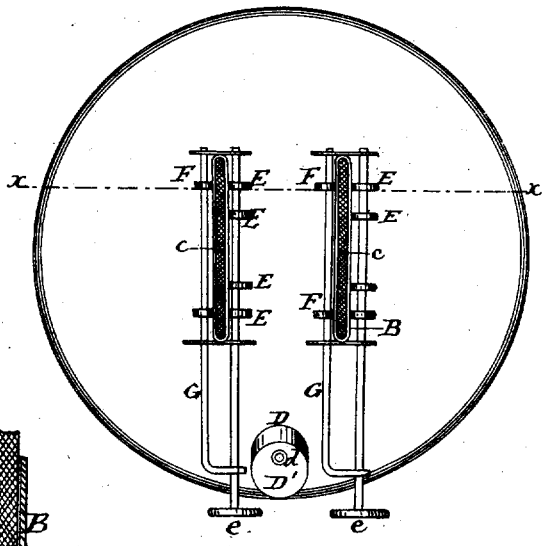
Figure 5:
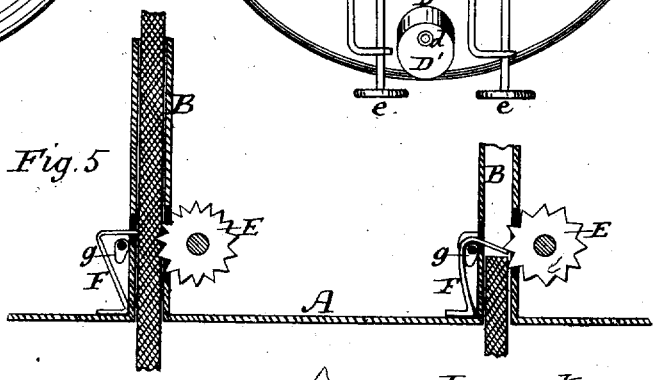

In the accompanying drawings, Figure 1 is a front elevation of my improved coal-oil lamp and heating apparatus; Fig. 2, a vertical section thereof transversely to the wick-tubes in line *x x* of Fig. 4; Fig. 3, a top view of the water-pan covering the oil-reservoir; Fig. 4, a top view of the oil-reservoir with the water-pan removed; Fig. 5, enlarged sectional views of the wick-tubes and their ratchet-wheels, illustrating the combination of the arresting-springs therewith.

A is the oil-reservoir, of the wide, flat, and shallow form usually adopted for use with coal-oil stoves; B B, two parallel wick-tubes projecting from the top thereof, and securely fastened thereto with tight joints. These wick-tubes are extremely wide, as illustrated in Fig. 4, to produce wide-extended flames; but they are divided each into two sections by a thin central transverse partition, *c*, Fig. 4, so that each wick is necessarily divided longitudinally in extending across the tube from end to end, or, rather, each tube is filled by two wicks, each fitting one of the sections, as illustrated in said Fig. 4.

D is an opening in the top of the reservoir, through which it is filled with oil. This opening is fitted with a nozzle covered by a cap, D, and is provided with a float-rod, *d*, inserted therein, to indicate automatically the height of the oil in the vessel.

E E are ratchet-wheels or toothed wheels formed and fitted, as usual, to the wick-tubes upon horizontal rods or shafts extending to the outer edge of the vessel, and terminating in thumb-screws *e e*, as shown in Fig. 4. Two of said ratchet-wheels are provided for each division of the wicks, as illustrated in said Fig. 4.

Opposite the ratchet-wheel of each wick, and on the opposite side of the wick therefrom, is secured a spring, F, (see Fig. 5,) whose upper free end is bent inward, so as to pass through a slot in the wick-tube, and when no wick intervenes engage with the teeth of the opposite ratchet-wheel, so as to prevent a revolution thereof. When the wick intervenes the spring bears thereon, but with such moderate pressure as not to impede its movement. Hence when the wick is above the ratchet-wheel the latter is free to move in either direction to elevate or depress the wick; but so soon as the wick drops below the upper tooth of the wheel, then projecting into the tube so as to expose it, the spring flies in over the wick, and by engaging said tooth prevents a further revolution of the wheel, and thus prevents the wick from being turned down entirely out of its reach, as clearly illustrated in Fig. 5 of the drawings.

In order to retract the springs or pawls F F, cams *g g* (see Fig. 5) are placed under each of them upon rods G G, (see Fig. 4,) extending parallel to the rods carrying the ratchet-wheels out to the front of the lamp. The front ends of these cam-rods G G are bent (see Fig. 4) to facilitate the partial revolution thereof required, in order to cause the cams *g g* to bear outwardly upon the springs F F and retract them from the toothed wheels E E and from pressure upon the wicks.

H is the water-pan of my improved stove-lamp. It is formed with separate arched recesses in its under side, terminating upwardly in extended flat tubes, said recesses and tubes being made to fit over, embrace, and cover the toothed wheels, springs, and wick-tubes projecting from the top of the oil-reservoir A, as illustrated in the sectional Fig. 2, and also in Fig. 3. The two arched recesses communicate with a flat recess, *v*, (see top view thereof in Fig. 3,) extending to the outer edge of the vessel, through or under which the ends of the ratchets and cam-rods extend to the front when the water-pan is placed upon the oil-reservoir. The front portion of the pan is cut off with a semicircular notch, (see Fig. 3,) to embrace the nozzle D of the oil-reservoir.

Upon the upper side of the projecting arches in the water-pan, forming the arched recesses on the under side thereof, covering the ratchet-wheels of the wick-tubes, and about the flat tubes projecting from the arches to embrace said wick-tubes, I place closely-fitting jackets K K, of felt, cotton cloth, or other absorbent material, to extend from the bottom of the pan to near the upper edge of the tubes, so as to keep said tubes constantly wet, and consequently cool, when the lamp is burning. Over this water-pan and the burners projecting therefrom I support upon legs L L an annular plate, M, upon which is placed a drum, completing the apparatus for cooking and heating purposes. This drum consists of a bottom plate, O, provided with extended cones P P, of ordinary form, to fit over the upper end of the wick-tubes and supply air to the flame, and with metallic chimneys R R, which are secured at their lower ends to the bottom plate, O, so as to embrace the cones P P, and at their upper ends to a top plate, S, through which they project slightly, as shown in Fig. 1; and it is completed by an outer perforated plate, N, secured to the rims of the top and bottom plates, S O, and inclosing the chimneys R R with an open chamber, as illustrated in Fig. 2.

Openings T T, Fig. 1, are provided for lighting the wicks and viewing the flames, said openings being closed by means of a sliding door, W, provided with mica windows corresponding thereto.

The ovens and other cooking utensils to be used with this stove are supported over the top plate, S, or combined therewith in the usual manner.

I claim as my invention—

1. In a coal-oil stove, the combination of the following elements: an oil-reservoir, an open water-reservoir, wick tube or tubes, wick-wheels, and wick-wheel shaft or shafts, the walls of said water-reservoir extending above the level of said wick-wheel shaft or shafts, substantially as described.

2. In a coal-oil stove, the combination of the following elements: an oil-reservoir, an open water-reservoir, wick tube or tubes, wick-wheels, and wick-wheel shaft or shafts, the walls of said water-reservoir extending to a horizontal plane above the wick-wheels and their shaft or shafts, substantially as and for the purpose set forth.

3. In a coal-oil stove, the combination of the following elements: an oil-reservoir, an open water-reservoir, wick tube or tubes, wick-wheels, and wick-wheel shaft or shafts, and a recess or recesses below the surface of the water, the wick-wheels and the shaft or shafts being within or below such recess or recesses, so that the water serves to protect the recess or recesses and the wick-wheels and their shaft or shafts, as well as the oil-reservoir, from the heat of the flames.

4. In a coal-oil stove, the combination, with an oil-reservoir, an open water-reservoir, and wick tube or tubes, of a recess or recesses inclosing wick-wheels and their shaft or shafts, the walls of said recess or recesses being in contact with the water in said water-reservoir, substantially as described.

5. Arched recesses formed, as herein described, upon the under side of the water-pan H, and terminating in extended tubes projecting upwardly from the arches on the upper side thereof, for the purpose of covering and embracing the wick-tubes of the lamp and the toothed wheels and rods operating its wicks, and to permit the water-pan to rest immediately upon the lamp, the whole being arranged and combined substantially as herein set forth.

6. The combination of jackets K K, of absorbent material, with the outer surface of the arches and tubes projecting from the bottom of the water-pan, to cover the same, substantially in the manner and for the purpose herein set forth.

7. The combination, with the wick-tube and wick-wheel of an oil-lamp, of a spring or pawl located on the opposite side of said wick-tube from said wick-wheel, substantially as described, so that said spring or pawl engages with and prevents further revolution of said wick-wheel when the wick is turned below the level of said spring, as set forth.

8. The combination of a cam, *g*, with the spring F, engaging the ratchet-wheel of the wick-tube of a lamp, and with an operating-rod, G, all substantially as and for the purpose herein set forth.

JNO. BOWLES.

Witnesses:
C. J. HEDRICK,
PHILIP MAURY.